A. E. SINK.
ELECTRIC CABLE.
APPLICATION FILED JULY 9, 1909.
990,398.
Patented Apr. 25, 1911.
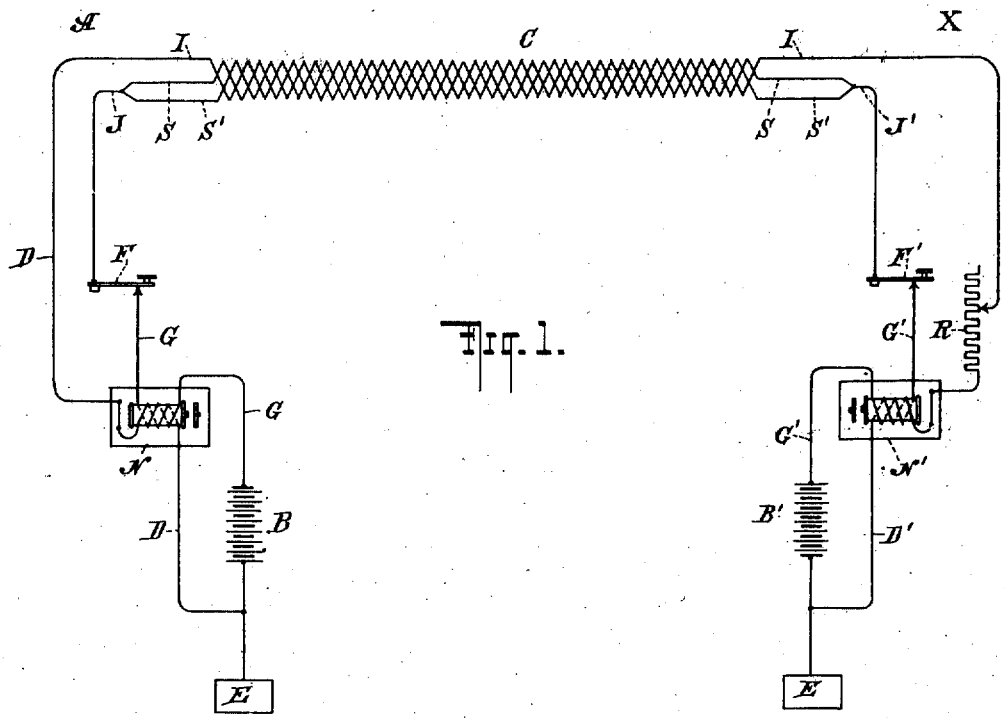
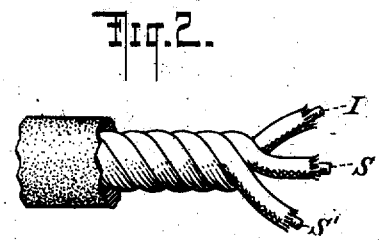
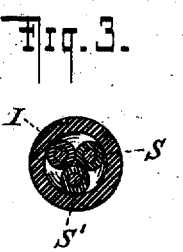
WITNESSES:
G. V. Rasmussen
Edmund Shillyoung
INVENTOR
ALBERT E. SINK
BY
Biesent Knauth
ATTORNEYS

UNITED STATES PATENT OFFICE.

ALBERT E. SINK, OF NEW YORK, N. Y.

ELECTRIC CABLE.

990,398. Specification of Letters Patent. Patented Apr. 25, 1911.

Application filed July 9, 1909. Serial No. 506,861.

*To all whom it may concern:*

Be it known that I, ALBERT E. SINK, a citizen of the United States, and resident of the borough of Brooklyn, county of Kings, city and State of New York, have invented certain new and useful Improvements in Electric Cables, of which the following is a specification.

My invention relates to electric cables particularly for telegraphic or telephonic communication and is equally applicable to aerial and underground cables, as well as those submerged in water, such as submarine cables.

The object of my invention is to enable messages or signals to be sent at great speed. For this purpose I employ a cable comprising a plurality of separately insulated strands intertwined or twisted together longitudinally, one of these strands being connected to the ground at each end so as to form a separate ground circuit in which I place an adjustable, preferably non-inductive resistance, while the other strand or strands is or are used for the transmission of signals.

My invention is illustrated in the accompanying drawings in which—

Figure 1 is a diagram of an arrangement embodying my invention; Fig. 2 is an outside view of a portion of the cable and Fig. 3 is a cross section of such cable.

A and X respectively indicate the two stations between which the cable C extends. This cable as shown in detail in Figs. 2 and 3 comprises a plurality of strands insulated separately and twisted together or intertwined longitudinally. In the particular instance shown there are three such strands, but I desire it to be understood that two strands may be sufficient or a greater number may be employed. In any event, one of the strands (designated by the letter I) is grounded at each of the stations by wires D leading to ground plates E. The other strand or strands, such as the strands S, S', form part of the circuit through which the signals are sent. In the particular construction shown the two strands S S' are electrically connected at their ends as indicated at J, J' and are thus equivalent to a single wire of greater cross section, so that in this case the only purpose of using two strands S S' is to reduce the resistance while employing strands of equal diameters. The diagram Fig. 1 shows each of the wires J J' connected with a key F F' connected by wires G G' with batteries B B', said batteries being suitably grounded. It will be observed that one of the wires G G' is connected with the positive pole of its battery and the other with the negative pole of the other battery. In this transmitting circuit I interpose any suitable device for producing signals, such as non-inductive relays N N' which operate a local circuit in the well-known manner. The grounded circuit of which the strand I forms part also contains an adjustable resistance R preferably of a non-inductive character. This grounded circuit includes portions coiled on the magnets of the relays N N' and I prefer to have the portions of the two circuits which are coiled on said magnets intertwined together in substantially the same manner as the strands of the cable proper and then coiled on the magnet so as to produce a magnet coil of the same character as disclosed in my application Letters Patent of the United States Ser. No. 473,971 filed January 25, 1909.

While I have shown an adjustable resistance R only at one of the stations it will be understood that such resistance may be provided at each of the stations. The particular arrangement shown provides for single transmission, but it will be understood that my invention may be applied to other systems of telegraphy or telephony.

With my invention I avoid the retarding effects due to the counter-electromotive force of inductance. The strand which is grounded through the adjustable non-inductive resistance acts inductively to throttle or neutralize the electromotive force generated by induction within the active or charged portion of the cable whenever the current flowing therein varies, or specifically is interrupted or restored, or reversed in direction. The longitudinal twisting or intertwining of the individual strands brings them to different relative positions at different points of their length, thus producing the neutralizing effect mentioned.

The electromotive force generated in the inductively charged circuit when the current flowing through the other (or active) circuit or circuits is varied (it being understood that a single strand of the active or charged circuit may be used independently if desired) acts in direct opposition to the electromotive force of induction produced in the active strand or strands. This neutralization is obtained without detracting from the current-carrying capacity of the active or charged strands, provided the resistance of the grounded inductive circuit is adjusted until the magnetic flux therein is sufficient to just annul the magnetic flux of inductance in the active circuit. It will be understood that the number of strands twisted together or intertwined may be varied without departing from the nature of my invention as defined in the claims.

With the addition of non-inductive apparatus at the terminals such a cable may be successfully operated at a high speed. In view of the small "choking" effect throughout the entire length of the circuit, ordinarily due to inductance, the danger of injury to the insulation from the charge of current in the active portion of the cable is minimized if not wholly removed.

While it is admitted that a small amount of energy is used up in inducing a current in the grounded inductive circuit, it is negligible in comparison with the advantage gained in the increased speed of transmission under conditions which are usually adverse thereto.

The cable may be protected from injury in any of the common methods in practice, my invention referring solely to the twisting or intertwining of a ground wire throughout the length of the cable the resistance of which may be varied.

By this improvement I claim to have removed the chief objection to operating telegraphic and telephonic long distance wires underground.

I claim as my invention:

1. An electric cable comprising a plurality of insulated strands intertwined longitudinally, one of said strands being grounded, while another strand or other strands serve for transmission, and an adjustable resistance in circuit with said grounded strand.

2. An electric cable comprising a plurality of insulated strands intertwined longitudinally, one of said strands being grounded, while another strand or other strands serve for transmission, and an adjustable non-inductive resistance in circuit with said grounded strand.

In witness whereof I have hereunto set my hand in the presence of two subscribing witnesses.

ALBERT E. SINK.

Witnesses:
 JOHN LOTKA,
 JOHN A. KEHLENBECK.